United States Patent [19]

Wiegand

[11] 3,780,313

[45] Dec. 18, 1973

[54] PULSE GENERATOR

[75] Inventor: John Richard Wiegand, Valley Stream, N.Y.

[73] Assignees: Milton Velinsky, Plainfield, N.J.; John R. Wiegand, Valley Stream, N.Y.; a part interest to each

[22] Filed: June 23, 1972

[21] Appl. No.: 265,681

Related U.S. Application Data

[63] Continuation-in-part of Ser. No. 91,066, Nov. 19, 1970.

[52] U.S. Cl. .......... 307/106, 310/168, 340/174 QB, 340/174 ZB

[51] Int. Cl. .......... H03k 1/00

[58] Field of Search .......... 307/106; 73/518, 73/519; 324/173, 174, 179, 166, 167; 310/168, 169, 170; 340/174 QB, 174 ZB

[56] References Cited

UNITED STATES PATENTS

| | | | |
|---|---|---|---|
| 3,296,618 | 1/1967 | Tuthill | 307/106 X |
| 3,246,219 | 4/1966 | Devol et al. | 340/174 ZB |
| 3,132,337 | 5/1964 | Martin | 310/170 X |
| 2,895,060 | 7/1959 | Dorn | 307/106 |
| 2,669,670 | 2/1954 | Eggers | 310/170 X |
| 2,411,140 | 11/1946 | Lindenblad | 307/106 X |
| 2,113,226 | 4/1938 | Young | 310/169 X |

*Primary Examiner*—J. V. Truhe
*Assistant Examiner*—William J. Smith
*Attorney*—Lloyd McAulay

[57] ABSTRACT

A pulse generator to provide a series of pulses through the switching of a magnetic domain in a two domain wire. The generator includes a read-out head having magnets and an inductive pick-up. As the wire from a rotor is moved past the read head, a first magnetic field in the read head switches a first domain in the wire. When the wire is next to the inductive pick-up, the net magnetic field on the wire is minimum and the magnetic bias on the first domain due to the magnetization of the second domain causes a switching of the second domain and the induction of a pulse in the pick-up coil. A second magnetic field is in opposition to the first magnetic field. The two magnetic fields are so positioned that they substantially cancel each other out at the area in front of the pick-up thereby determining the location where the second domain switches.

14 Claims, 5 Drawing Figures

PATENTED DEC 18 1973 3,780,313

INVENTOR
JOHN R. WIEGAND
BY Dautzman, Hayes, Kalb and Chilton
ATTORNEYS

PULSE GENERATOR

This application is a continuation-in-part of Ser. No. 91,066 filed on Nov. 19, 1970.

BACKGROUND OF THE INVENTION

The present invention relates to a new and improved pulse generator of the type adapted for inductively generating electrical pulses.

It is a principal aim of the present invention to provide a new and improved pulse generator for inductively generating electrical pulses with a high signal-to-noise ratio.

It is another aim of the present invention to provide a new and improved pulse generator of the type having an inductive readout device and one or more magnetic elements movable relative to the readout device through a readout station thereof for inductively generating an electrical pulse in the readout device and wherein the pulse generator is operable to generate an electrical pulse with a high signal-to-noise ratio at a very low and even negligible rate of relative movement of the magnetic element through the readout station.

It is a further aim of the present invention to provide a new and improved pulse generator of the type described for inductively generating electrical pulses having a polarity dependent upon the direction of relative movement of the magnetic elements through the readout station.

It is another aim of the present invention to provide a new and improved rotary pulse generator for inductively generating an electrical pulse for each fixed increment of rotation of the rotator of the pulse generator.

It is a further aim of the present invention to provide a new and improved bidirectional rotary pulse generator for inductively generating electrical pulses in both directions of rotation of the pulse generator rotor.

It is a still further aim of the present invention to provide a new and improved inductive readout head for a pulse generator of the type described.

It is another aim of the present invention to provide a new and improved pulse generator operative throughout a substantial temperature range.

It is another aim of the present invention to provide a low cost pulse generator of the type described providing reliable operation over a long service-free life.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWINGS

In the drawings:

FIG. 4 is taken substantially along line 4—4 of FIG. 1.

FIG. 5 taken along the line 5—5 of FIG. 5.

DESCRIPTION OF THE PREFERRED EMBODIMENT

Figure 1:
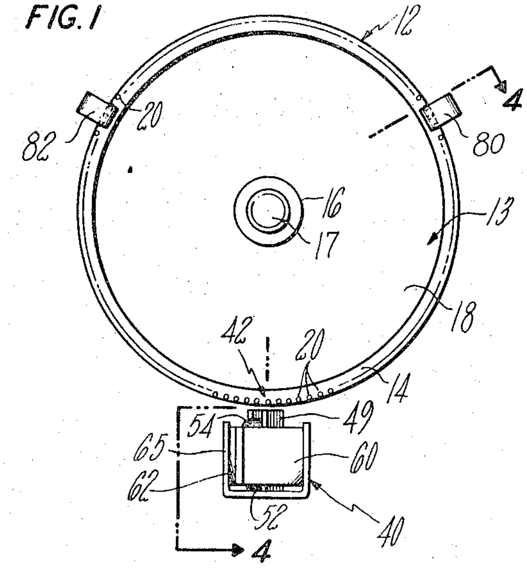
FIG. 1 is an end of view of a rotary pulse generator incorporating the present invention.

Referring now to the drawings in detail wherein like numerals represent like parts throughout the several figures, a rotary pulse generator incorporating the present invention is shown comprising a rotor 12 having a molded plastic support 13 with an outer rim or flange 14, an inner hub 16 having a central opening for receiving a drive shaft 17 and an intermediate web 18. The rim 14 is of generally cylindrical shape and a plurality of equiangularly spaced straight magnetic wires 20 are mounted in axially extending outer recesses in the rim.

The magnetic wires 20 are preferably of a type described in my pending U.S. Pat. application Ser. No. 247,356, dated Apr. 25, 1972, and entitled "Bistable Magnetic Device." As described more fully in said pending application, each magnetic wire 20 is formed from a magnetizable wire preferably of substantially uniform composition which has been treated to form a relatively magnetically soft central core 22 and a relatively magnetically hard shell 24. The shell 24 has high coercivity and the capacity to be permanently magnetized in an axial direction. The core 22 also can be magnetized in an axial direction but has a low coercivity.

The term "coercivity" is used herein in its traditional sense to indicate the magnitude of the external magnetic field necessary to bring the net magnetization of a magnetized sample of ferromagnetic material to zero.

Figure 2:
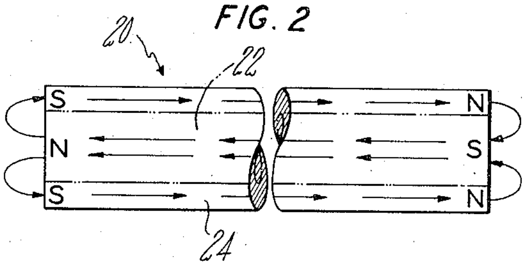
FIG. 2 is an enlarged generally diagrammatic longitudinal view, partly broken away, of a magnetic wire utilized in the rotary pulse generator of this invention.
Figure 3:
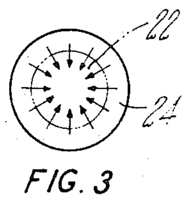
FIG. 3 is a generally diagrammatic end view of the magnetic wire of FIG. 2.

As described more fully in said pending application, the wire 20 can be formed by drawing a wire of ferromagnetic material, for example, a nickel-iron alloy, and workhardening the wire such as by circumferentially straining it to form the desired shell-core structure. The wire 20 then is magnetized by subjecting it to an external magnetic field. The relatively "hard" shell 24 has a coercivity sufficiently greater than that of the relatively "soft" core 22 so that when the external magnetic field is removed, the shell retains its net magnetization and couples or "captures" the core by reversing the core's net magnetization into an axial direction opposite to the direction of net magnetization of the shell. The core forms a magnetic return path or shunt for the magnetic shell as shown by the flux lines illustrated in FIGS. 2 and 3. The shell's capturing of the core establishes a cylindrical magnetic domain wall 26 between the shell 24 and core 22. This domain wall is the transitional zone between the shell, where the magnetic moments summed vectorially are oriented with a preference for a particular direction, and the core, where the vectorial sum of the magnetic moments have a preference for the opposite direction. It presently is believed that the width of this transitional zone, or domain wall, is in the order of magnitude of about 1,000 molecules (one micron).

The permanent magnet shell 24 provides a magnetic bias on the core 22 for magnetizing the core in an axial direction opposite to the axial direction of magnetism of the shell 24. Reversal of the field direction of the core results in an abrupt change in the magnetic flux surrounding the wire. When the permanent magnet is removed from the vicinity of the wire, the shell "recaptures" the core providing an additional abrupt change in the magnetic flux surrounding the wire. In either case, this core net magnetization reversal occurs through the process of the nucleation of a magnetic domain at one end, or both ends, of the wire core and propagation (that is, movement) of a "transverse" domian wall (not the cylindrical domain wall 18) along the length of the wire. More explicity, the transverse domain wall that is propagated during switching extends across the diameter of the core and is believed to be somewhat conical in shape. This somewhat conically shaped domain wall travels axially along the core during the process of switching and exists only during the process of switching. After this conically shaped domain wall has terminated, the domain wall 18 will either have been created (when the shell captures the core from an external field) or will have been eliminated (when an external field captures the core from the shell).

In general, the rate of propagation of the domain wall along the wire is a function of the wire composition, metallurgical structure, diameter and length, and of the strength of the external magnetic field. A coil placed adjacent to the wire will have a current pulse induced therein by this abruptly changing magnetic field.

As further described in my aforementioned pending application, the magnetic wire 20 may, for example, be formed from an alloy of 48 percent iron and 52 percent nickel and have a diameter of 0.012 inches and a length of 0.550 inches. When employing such a wire in the pulse generator described herein it has been found that optimum results are achieved by mounting the magnetic wires 20 on the rim 14 to be spaced approcimately 0.037 inches and such that for example, with a rotor having one hundred equiangularly spaced magnetic wires 20, the magnetic wires 20 would be equiangularly spaced on a circle having a diameter of approximately 1.178 inches.

Figure 4:
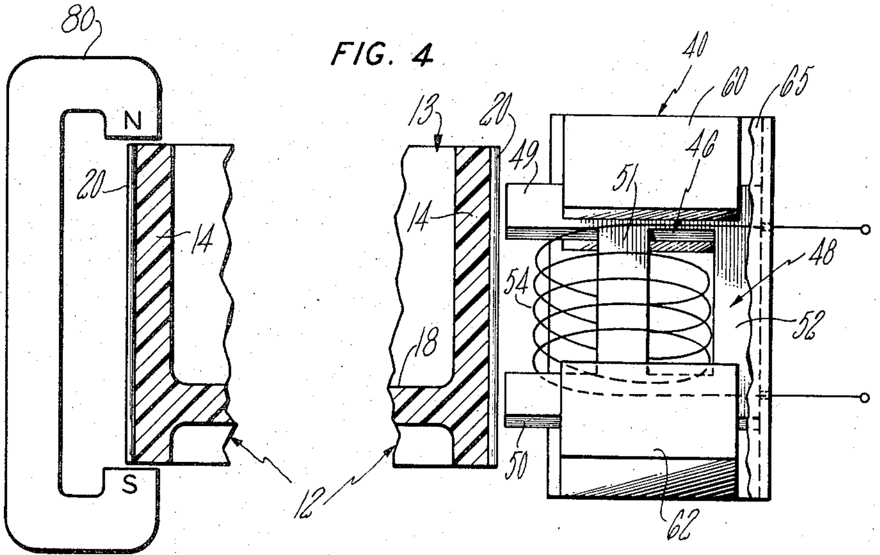
FIG. 4 is an enlarged section view, partly broken away and partly in section of the read-out head.

A read-out head 40 is provided for individually "reading" each magnetic wire 20 by inductively generating an electrical pulse as hereinafter described as each wire 20 reaches a read-out station 42 of the read-out head 40 (shown by the position of the wire 20 in FIG. 5) and, therefore, generating a pulse for each substantially fixed increment of rotation of the rotor 12. The read-out head 40 comprises an inductive pick-up 46 having a soft iron laminated core 48 with a generally square-A shape and having a pair of parallel legs 49, 50, center and rear bridge pieces 51, 52, and a pick-up coil 54 encircling the center bridge piece 51. The free ends of the core legs 49, 50 provide pick-up poles having a spacing shown in FIG. 4 to be less than the length of the magnetic wire 20.

The read-out head 40 also comprises a pair of opposed U-shaped permanent magnets 60, 62 which preferably are substantially identical and have substantially equal magnetic characteristics. The permanent magnets 60, 62 and mounted immediately above and below the inductive pick-up 46 in engagement with the pick-up core 48 and are provided for establishing a permanent magnet field 66, 67 for reversing the magnetism of the core 22 of the magnetic wire 20 as the wire approaches the read-out station 42. The two permanent magnets 60, 62 are mounted in generally overlying opposed relationship with each pole of each magnet facing an opposite pole of the other magnet.

In the embodiment shown, the opposed permanent magnets 60, 62 are inclined relative to one another and are laterally off-set relative a plane 64 through the center of the core 48 so that the sides of the legs 49, 50 of the pick-up core 48 will physically engage like pole pieces (the north poles in the embodiment shown) of the permanent magnets 60, 62. As a consequence, the plane 64 that bi-sects the pick-up core 48 is at an angle (approximately 12° in the embodiment shown) to the axis of the rotor 12 and to the axes of the wires 20. The geometry of the pick-up core 48 and magnets 60, 62 might be designed to avoid the need for the inclination shown in FIG. 5.

A purpose in having the core legs 49, 50 in contact with like poles of the facing magnets 60, 62 is to create amagnetic circuit configuration wherein the core material does not serve as a shunt for the flux path between the two magnets 60, 62 so that the fields 66, 67 will be sufficiently strong to perform the desired function of capturing the core 22.

In addition, it has been found useful to employ a thin U-shaped soft iron magnetic shield 65 around the back and partially around the sides of the pick-up 46 and permanent magnet 60, 62 assembly and such that the sides of the shield 65 extend generally parallel to the axis of the magnetic wire 20 at the read-out station.

Figure 5:
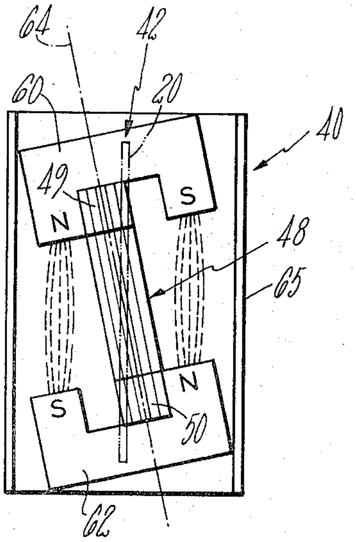
FIG. 5 is an enlarged front view of a read-out head of the rotary pulse generator additionally illustrating in broken lines a portion of the magnetic field of the read-out head in an undisturbed state thereof and a magnetic wire at a read-out station of the read-out head.

The permanent magnets 60, 62 are so related to each other and to the pick-up core 48 that a significant portion of their magnetic flux extends between the generally opposed and opposite poles of the permanent magnets 60, 62 as illustrated in FIG. 5 and such that a substantial magnetic gradient is established across the central plane 64 that bi-sects the pick-up core 48.

With the rotor 12 rotating in the clockwise direction as viewed in FIG. 1, the magnetic wires 20 pass from left to right across the read-out head 40 as viewed in FIG. 5. The polarity alignment of the permanent magnets 60, 62 establishes a leading magnetic field 66 having its polarity opposite in direction to that of the shell of the approaching wire 20. For example, as viewed in FIG. 5 the shell 24 has its south pole at the upper end and north pole at the lower end while the leading field 66 has has its north pole at the upper end and south pole at the lower end. The trailing field 67 and shell 24 have the same polarity alignment, namely the south pole at the upper end and the north pole at the lower end. This alignment establishes a null position at the reading station 42 midway between the leading and trailing fields. As each magnetic wire 20 approaches the leading field 66, the orientation of the magnetic field of the core 22 is established by, and, therefore, opposite to that of the shell 24. When the magnetic wire 20 reaches a position in the leading field 66 where the strength of the field 66 is sufficiently strong, the core 22 is captured by the permanent magnets 60, 62 reversing the polarity alignment of the core and establishing a core net magnetization in opposition to the magnetic bias of the wire shell 24. The entire magnetic wire 20 (core 22 and shell 24) is therefore magnetized in one direction in conformity with the leading permanent magnet field 66 of the read-out head 40. The configuration of leading permanent magnet field of the read-out head is therefore affected by the wire 20 as the wire approaches the read-out station 42. Because the leading field 66 is spaced from the inductive pick-up 46, the field change produced when the field 66 captures the core 22 induces a pulse of minimal magnitude.

As the magnetic wire is moved across the face of the read-out head 40 it leaves the leading magnetic field 66 and approaches the read-out station 42. As the wire leaves the leading magnetic field 66 it will reach a position where the magnitude of the leading field 66 drops below a certain level at which point the shell 24 recaptures the core 22 reversing the core's polarity. This reversal occurs in close proximity to the inductive pick-up 46 and produces an abrupt change in field around the wire which induces a significant pulse in the inductive pick-up. The magnetic reversal of the core 22 is accomplished by nucleation and propagation of a transverse magnetic domain wall along the length of the core 22. Such reversal of the core's polarity abruptly changes the shell's flux path from a path external to the wire 20 to a path through the core 22 (see FIG. 2). This change in field around the wire 20 induces an electrical signal in the inductive pick-up 46 having a high signal-to-noise ratio and having a strength, in one embodiment, of 50 millivolts or more. It is believed that the abrupt reversal of the core magnetism and concomitant generation of an electrical pulse with a high signal-to-noise radio is due to the precise location of the "firing" point of the core 22 in front of the inductive pick-up 46, and the axial anisotropy of the core 22. It has been found that the strength of the electrical pulse is substantially independent of the angular speed of the rotor 12, and although a slightly stronger signal is generated when the rotor 12 is rotated at a higher speed (e.g., 80 RPM) a strong signal is nevertheless generated at an extremely low angular velocity of the rotor 12.

The precise locating of the "firing" point of the core 22 in front of the inductive pick-up 46 important to assure the generation of an electrical pulse with a high signal-to-noise ratio. In certain environments, the magnetic shielding provided by the shield 65 aids in assuring that the predetermined location of the "firing" point of the core is at this predetermined location. The use of a trailing magnetic field 67 in opposition to the leading magnetic field 66 establishes a sharper field gradient across the read head and thus locates the firing point of the wire much more precisely and repeatably than would be the case if only a leading field 66 were employed. The axial anisotropy of the core 22 is believed to be an important factor in assuring that the reversal of the core magnetization is abrupt and substantially independent of the rate at which the wires 20 travel past the pick-up 46. Accordingly, although the shell 24 is magnetically "harder" than the core 22 (that is, the coercivity of the shell 24 is greater than the coercivity of the core 22), it is important that the core have substantial coercivity.

One advantage of the A design for the pick-up head is that it provides a design in which minimum flux from the magnet 60, 62 passes through the core on which the coil 54 is wound. As a result, the core is not saturated and the flux change coupled through the core of the pick-up coil 54 due to the switching of the magnetic state of the wire 20 is maximum.

As indicated, it is desirable to "fire" the magnetic core 22 of each wire 20 precisely as the wire reaches the read-out station 42 (i.e., as the wire crosses the pick-up pole centerline 64). It is also preferred that each core 22 be "fired" by nucleation of a magnetic domain wall in the wire 20 at the same end of each wire so that the induced pulses are substantially identical. It is for these reasons that the read-out head 40 is oriented at an angle relative to the axis of a magnetic wire 20 at the read-out station.

PRE-MAGNETIZATION

If the permanent magnets 60, 62 are sufficiently strong to premagnetize the shell 24 of eachmagnetic wire 20, the rotor 12 may be rotated in both directions and each magnetic wire will be "fired" at the readout station 42 by abrupt reversal of the magnetism of the magnetic core 22 of the wire in both directions of rotation. The shell induced pulse has a polarity dependent upon the direction of rotation of the rotor 12. Thus, for example, the leads of the coil 54 can be connected to suitable circuitry for subtracting the pulses occurring in one direction from those occurring in the opposite direction for encoding the angular position of the rotor 12 or for establishing an output pulse train having a number of pulses corresponding to the angular rotation of the rotor 12 in one angular direction only.

As indicated, the permanent magnets 60, 62 may be sufficiently strong to magnetize the wire shell 24 and such that the leading permanent magnet field of the readout head properly presets the entire wire for subsequent reversal of the magnetism of the core 22.

In addition, relatively strong U-shaped permanent magnets 80, 82 may be mounted for preconditioning or presetting each magnetic wire 20 in advance of each permanent magnet field of the readout head 40. Each permanent magnet 80, 82 would be mounted to establish a magnetic field having the same direction as the corresponding permanent magnet field of the readout head and preferably has a substantially stronger field than the corresponding permanent magnet field of the readout head to ensure full preconditioning or premagnetizing of the wire shell. Thus, where a bidirectional pulse generator is desired, two such permanent magnets 80, 82, one for each permanent magnet field of the readout head, would be used to ensure that each magnetic wire 20 is fully preset before reaching the readout head 40 irrespective of the direction of rotation of the rotor 12.

Although the permanent magnets 60, 62 could be made strong enough so as to set the shell as well as the core, so that the magnets 80, 82 would not be required, it is preferred to employ these additional magnets 80 and 82. The use of the shell setting magnets 80, 82 means that the head magnet 60, 62 can be weaker and smaller than otherwise would be the case and this means that a smaller head design is made possible. As a general rule, the smaller the head design the larger the output pulse that can be obtained during switching. In addition, if the head magnets 60, 62 do not have to switch the shell then there is no field perturbation due to this shell switching and there will be less background noise picked up by the pick-up coil 54. When the shell 24 is switched or set by the magnets 80, 82, the domain travels relatively slowly and requires a stronger field than is required to switch the core. Thus, this shell may not adequately switch unless the shell setting magnet has the strength and size necessary to assure the setting of the shell. By placing the shell setting magnets 80 and 82 apart from the head 40 it becomes more convenient to design these magnets to have the required strength and size to assure that the shell is appropriately magnetized each time prior to alignment adjacent to the pick-up coil 54 where, as a result of capturing the core by the shell, a pulse is generated.

As will be apparent to persons skilled in the art, various modifications, adaptions and variations of the foregoing specific disclosure can be made without departing from the teachings of the present invention.

What is claimed is:

1. A pulse generator emoloying a wire having a first magnetic domain and a second magnetic domain, at least said first domain being capable of retaining net magnetization after being subjected to a magnetic field, said domains being separated by a domain wall when said first domain has a net magnetization in a first direction and said second domain has a net magnetization in a second direction substantially opposite from said first direction, comprising:

a support on which the wire is mounted, a read-out device, and motive means for moving said support and said read-out device relative to each other to bring the wire into close proximity to said read-out device, said read-out device including a magnetic means to establish a first magnetic field strong enough to cause the direction of magnetization of both of said domains to be in a first direction when said motive means causes a first predetermined position to be attained between the wire and said first magnet, said read-out device including a pick-up spaced from said first predetermined position such that, when said motive means causes the wire and said pick-up to be in close proximity after said first predetermined position, the strength of said first magnetic field is low enough that the direction of magnetization in said second domain is reversed due to the bias of said first domain.

2. The pulse generator of claim 1 further comprising:

a second magnetic field established by said magnetic means, said second magnetic field being strong enough to cause the direction of magnetization of both of said domains to be in a second direction when said motive means causes a second predetermined position to be attained between the wire and said second magnet, said second predetermined position being spaced from said pick-up such that, when said motive means causes the wire and said pick-up to be in close proximity after said second predetermined position, the strength of said second magnetic field is low enough that the direction of magnetization in said second domain is reversed due to the bias of said first domain.

3. The pulse generator of claim 1 further comprising:

a first setting magnet spaced from said read-out device to set the direction of magnetization of the first domain in said first direction prior to attaining said first predetermined position.

4. The pulse generator of claim 2 further comprising:

a first setting magnet spaced from said read-out device to set the direction of magnetization of the first domain in said first direction prior to attaining said first predetermined position, and a second setting magnet spaced from said read-out device to set the direction of magnetization of the first domain in said second direction prior to attaining said second predetermined position.

5. The pulse generator of claim 2 wherein said first and second directions are opposite to one another.

6. The pulse generator of claim 4 wherein said first and second directions are opposite to one another.

7. The pulse generator of claim 2 wherein said first and second magnetic fields substantially cancel each other out at a third predetermined position in close proximity to said pick-up to provide a predetermined location for the reversal of the direction of magnetization in the second domain.

8. The pulse generator of claim 7 wherein said first and second directions are opposite to one another.

9. The pulse generator of claim 1 wherein:

said first magnetic field has a strength great enough to set the direction of magnetization of both of said domains.

10. The pulse generator of claim 2 wherein:

said first and second magnetic fields have a strength great enough to set the direction of magnetization of both of said domains.

11. The pulse generator of claim 10 wherein said first and second directions are opposite to one another.

12. The pulse generator of claim 3 wherein:

the strength of said first magnetic field is sufficient to set the direction of magnetization of the first domain.

13. The pulse generator of claim 4 wherein:

the strength of said first and second magnetic fields are insufficient to set the direction of the magnetization of the first domain.

14. The pulse generator of claim 13 wherein said first and second directions are opposite to one another.

* * * * *

UNITED STATES PATENT OFFICE
CERTIFICATE OF CORRECTION

Patent No. 3,780,313 Dated December 18, 1973

Inventor(s) John Richard Wiegand

It is certified that error appears in the above-identified patent and that said Letters Patent are hereby corrected as shown below:

Col. 1, line 32, "rotator" should read --rotor--.
Col. 1, line 56, omit "of" first instance.
Col. 3, line 6, "domian" should read --domain--.
Col. 3, line 32, "approci-" should read --approxi- --.
Col. 3, line 57, "and" , first occurrence, should read -- are --
Col. 4, line 14, "amagnetic" should read -- a magnetic--.
Col. 4, line 41, omit "has" first instance.
Col. 6, line 4, "eachmagnetic" should read --each magnetic--.
Col. 7, line 4, "emoloying" should read --employing--.
Col. 8, line 38, "sufficient" should read --insufficient--.

Signed and sealed this 10th day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334